(12) United States Patent
Kusunose (10) Patent No.: US 9,705,328 B2
(45) Date of Patent: Jul. 11, 2017

(54) STARTUP CONTROL METHOD, GRID INTERCONNECTION APPARATUS, AND CONTROLLER

(75) Inventor: Tomonari Kusunose, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 693 days.

(21) Appl. No.: 14/234,332

(22) PCT Filed: Jul. 19, 2012

(86) PCT No.: PCT/JP2012/068326
§ 371 (c)(1),
(2), (4) Date: Jan. 22, 2014

(87) PCT Pub. No.: WO2013/015191
PCT Pub. Date: Jan. 31, 2013

(65) Prior Publication Data
US 2014/0152101 A1    Jun. 5, 2014

(30) Foreign Application Priority Data

Jul. 22, 2011 (JP) .................. 2011-161246

(51) Int. Cl.
*H02J 3/00* (2006.01)
*H02J 3/32* (2006.01)
(Continued)

(52) U.S. Cl.
CPC ............ *H02J 3/006* (2013.01); *H02J 3/32* (2013.01); *H02J 3/383* (2013.01); *H02J 7/35* (2013.01);
(Continued)

(58) Field of Classification Search
CPC .... H02J 3/006; H02J 3/32; H02J 3/383; H02J 7/35; H02J 3/08; Y02E 10/563; Y02E 10/566; Y02E 70/30; Y10T 307/344
(Continued)

(56) References Cited

U.S. PATENT DOCUMENTS 8,922,056 B2 * 12/2014 Thisted ................. H02J 7/34
307/18
8,941,263 B2 * 1/2015 Lee ....................... H02J 3/32
307/140

(Continued)

FOREIGN PATENT DOCUMENTS

JP    01-243826 A    9/1989
JP    2000-023367 A    1/2000
(Continued)

OTHER PUBLICATIONS

Extended European Search Report dated Jul. 1, 2015 issued by the European Patent Office for Counterpart European Application No. EP 12 81 8172.4.
(Continued)

*Primary Examiner* — Rexford Barnie
*Assistant Examiner* — Elim Ortiz
(74) *Attorney, Agent, or Firm* — Procopio Cory Hargreaves and Savitch LLP (57) ABSTRACT

A startup control method of controlling startup of a PV PCS 150 configured to perform interconnected operation in which a PV 100 is interconnected to a grid 10 to supply power to a load 400: supplies power from independent operation output of the PV PCS 150 to a storage PCS 250 by an independent operation that does not interconnect the PV 100 to the grid 10 before starting the interconnected operation; measures the output power amount of the PV 100 or the PV PCS 150 when the power is supplied to the storage PCS
(Continued)

250; and stops the independent operation to start the interconnected operation when the measured output power amount is larger than a predetermined amount.

6 Claims, 4 Drawing Sheets

(51) Int. Cl.
    *H02J 3/38*     (2006.01)
    *H02J 7/35*     (2006.01)
    *H02J 3/08*     (2006.01)

(52) U.S. Cl.
    CPC .............. *H02J 3/08* (2013.01); *Y02E 10/563* (2013.01); *Y02E 10/566* (2013.01); *Y02E 70/30* (2013.01); *Y10T 307/344* (2015.04)

(58) Field of Classification Search
    USPC .......................................................... 307/23
    See application file for complete search history.

(56) References Cited

U.S. PATENT DOCUMENTS

| | | | | |
|---|---|---|---|---|
| 2004/0070280 A1* | 4/2004 | Nakata | ...................... | H02J 3/32 307/69 |
| 2011/0006905 A1* | 1/2011 | Masuda | ................ | H01M 10/44 340/636.1 |
| 2011/0144822 A1* | 6/2011 | Choi | ......................... | H02J 3/32 700/297 |

FOREIGN PATENT DOCUMENTS

| | | |
|---|---|---|
| JP | 2000-350468 A | 12/2000 |
| JP | 2010-130836 A | 6/2010 |
| WO | 2008-138016 A1 | 11/2008 |

OTHER PUBLICATIONS

International Search Report; PCT/JP2012/068326; Oct. 2, 2012.
Office Action dated Jun. 2, 2015, issued in counterpart Chinese Application No. 201280036145.6.
Office Action dated Mar. 3, 2016, issued in counterpart European Application No. 12 818 172.4-1804.
Office Action dated Dec. 2, 2014, issued in counterpart Japanese Application No. 2011-161246.
Office Action dated Nov. 13, 2015, issued in counterpart Chinese Application No. 201280036145.6.
Office Action dated Feb. 3, 2016, issued in counterpart Chinese Application No. 201280036145.6.

* cited by examiner

STARTUP CONTROL METHOD, GRID INTERCONNECTION APPARATUS, AND CONTROLLER

TECHNICAL FIELD

The present invention relates to a startup control method of controlling startup of a grid interconnection apparatus to which output power of a photovoltaic cell is input, the grid interconnection apparatus, and a controller.

BACKGROUND ART

In recent years, a photovoltaic cell that receives sunlight to generate power is becoming widely used among power consumers. Along with the wide use of the photovoltaic cell, a grid interconnection apparatus (so-called power conditioner) that interconnects the photovoltaic cell to a commercial power grid (hereinafter, "grid") to supply power to a load is also becoming widely used.

The grid interconnection apparatus has a grid interconnection relay for performing off-line of the photovoltaic cell from the grid (see Patent Literature 1, for example).

The grid interconnection apparatus is configured to perform interconnection stop control that detects a state where an output power amount of the grid interconnection apparatus is too small with respect to a power consumption amount of the load (at nighttime, for example), turns off a grid interconnection relay to perform off-line of the photovoltaic cell from the grid, and stops operation of the grid interconnection apparatus.

Further, the grid interconnection apparatus performs startup control that detects a state where output power of the photovoltaic cell can be acquired, turns on the grid interconnection relay to interconnect the photovoltaic cell to the grid, and starts an interconnected operation.

CITATION LIST

Patent Literature

Japanese Patent Publication No. 2000-350468

SUMMARY OF THE INVENTION

However, when the output power amount of the photovoltaic cell can be hardly acquired for a reason such as an extremely small solar radiation state in early morning or cloudy weather, for example, at the time of starting up the grid interconnection apparatus, the grid interconnection apparatus turns off the grid interconnection relay to stop, immediately after the startup, by the above-described interconnection stop control. Then, the grid interconnection apparatus turns on the grid interconnection relay to restart, immediately after the stop, by the above-described startup control.

As a consequence, there is a problem that the startup and stop of the grid interconnection apparatus, that is, turning on and off the grid interconnection relay (the startup and stop of the grid interconnection apparatus) is repeated.

Therefore, an object of the present invention is to provide a startup control method with which it is possible to prevent a grid interconnection apparatus from repeating startup and stop, the grid interconnection apparatus, and a controller.

To solve the aforementioned problem, the present invention has following features.

The feature of a startup control method according to the present invention is summarized as follows. A startup control method of controlling startup of a grid interconnection apparatus (PV PCS 150) configured to perform interconnected operation in which output power of a photovoltaic cell (PV 100) is input to the grid interconnection apparatus and the photovoltaic cell is interconnected to a grid (grid 10) to supply power to a load (load 400), comprises: a step A of supplying power from independent operation output of the grid interconnection apparatus to a predetermined load (storage battery 200, storage PCS 250) by an independent operation that does not interconnect the photovoltaic cell to the grid before starting the interconnected operation; a step B of measuring the output power amount of the photovoltaic cell or the grid interconnection apparatus when the power is supplied to the predetermined load in the step A; and a step C of stopping the independent operation to start the interconnected operation when the output power amount measured in the step B is larger than a predetermined amount.

According to such a feature, an independent operation is performed before starting an interconnected operation, and it is therefore possible to perform a test to check how much an output power amount of a photovoltaic cell (alternatively, an output power amount of the grid interconnection apparatus) can be acquired during the interconnected operation. In addition, it is confirmed that the output power amount of the photovoltaic cell (alternatively, the output power amount of the grid interconnection apparatus) can be sufficiently acquired and then the interconnected operation is started, and thereby eliminating that the grid interconnection apparatus stops immediately after startup, thus making it possible to prevent the grid interconnection apparatus from repeating startup and stop.

Another feature of the startup control method according to the present invention is summarized as follows. In the aforementioned feature, the predetermined load includes a storage battery (storage battery 200) with a variable charge amount, and the method further comprises a step D of charging the storage battery with power supplied in the step A.

Another feature of the startup control method according to the present invention is summarized as follows. In the aforementioned feature, the step B includes a step B1 of measuring the output power amount of the photovoltaic cell or the grid interconnection apparatus while varying the charge amount of the storage battery.

Another feature of the startup control method according to the present invention is summarized as follows. In the aforementioned feature, the predetermined load includes: the storage battery; and another grid interconnection apparatus (storage PCS 250) capable of interconnecting the storage battery to the grid, the another grid interconnection apparatus is connected to the independent operation output of the grid interconnection apparatus via a power line (PV independent output line PL4), and the step A includes a step A1 of supplying alternating-current power to the another grid interconnection apparatus from the independent operation output via the power line.

The feature of a grid interconnection apparatus according to the present invention is summarized as follows. A grid interconnection apparatus configured to perform an interconnected operation in which output power of a photovoltaic cell is input to the grid interconnection apparatus and the photovoltaic cell is interconnected to a grid to supply power to a load, comprises: a supply unit (inverter 151, independent output relay 153, PV controller 154) that supplies power from independent operation output of the grid interconnection apparatus to a predetermined load by an independent operation that does not interconnect the photovoltaic cell to the grid before starting the interconnected operation at the time of starting up the grid interconnection apparatus; and an interconnected operation unit (inverter 151, grid interconnection relay 152, PV controller 154) that stops the independent operation to start the interconnected operation when the output power amount of the photovoltaic cell or the grid interconnection apparatus is larger than a predetermined amount at the time of supplying power from the independent operation output to the predetermined load.

The feature of a controller according to the present invention is summarized as follows. A controller (HEMS 600) that controls a grid interconnection apparatus configured to perform an interconnected operation in which output power of a photovoltaic cell is input to the grid interconnection apparatus and the photovoltaic cell is interconnected to a grid to supply power to a load, comprises: a supply control unit (HEMS controller 610, transceiver 620) that performs control to supply power from the independent operation output of the grid interconnection apparatus to a predetermined load by the independent operation that does not interconnect the photovoltaic cell to the grid before starting the interconnected operation at the time of starting up the grid interconnection apparatus; and an operation control unit (HEMS controller 610, transceiver 620) that performs control to stop the independent operation to start the interconnected operation in a case where the output power amount of the photovoltaic cell or the grid interconnection apparatus when power is supplied from the independent operation output to the predetermined load, is larger than a predetermined amount.

DESCRIPTION OF THE EMBODIMENT

With reference to the drawings, the description will be given of the first embodiment to the third embodiment, and the other embodiment of the present invention. In the following drawings of each of the embodiments, the same or similar reference signs are applied to the same or similar portions.

First Embodiment

Figure 1:
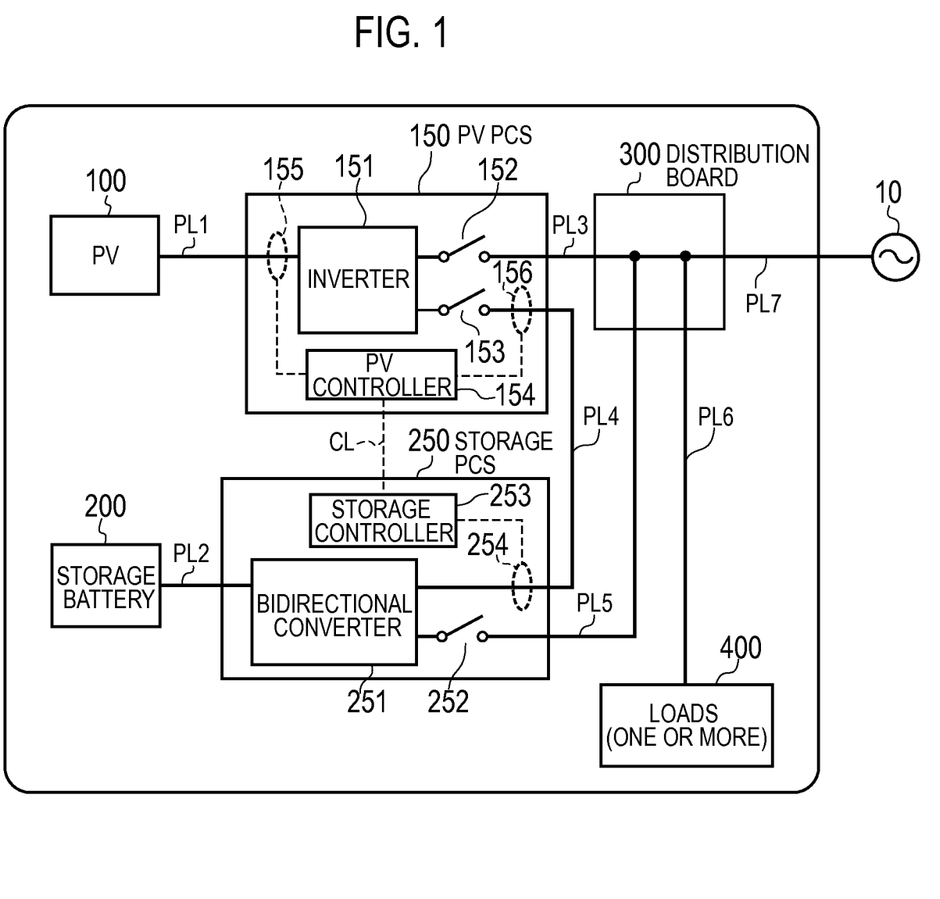
FIG. 1 is a block diagram of a power control system according to the first embodiment and the second embodiment.

FIG. 1 is a block diagram of a power control system according to the present embodiment. In the following block diagram, a power line is shown by a thick line, and a communication line (a signal line) is shown by a dashed line. Note that, the communication line may not be limited to be wired but may be wireless.

As shown in FIG. 1, the power control system according to the present embodiment is provided with a photovoltaic cell (a PV) 100, a PV power conditioner (a PV PCS) 150, a storage battery 200, a storage power conditioner (a storage PCS) 250, a distribution board 300, and one or more loads 400 at a consumer who receives the supply of alternating-current (AC) power from a grid 10 of an electric power company.

In the present embodiment, the PV PCS 150 corresponds to the grid interconnection apparatus configured to perform an interconnected operation in which output power of the PV 100 is input to the grid interconnection apparatus and the PV 100 is interconnected to the grid 10 to supply power to the load 400.

The PV 100 receives sunlight to generate power and outputs direct-current (DC) power acquired by the power generation to the PV PCS 150 via a PV power line PL1 provided between the PV PCS 150 and the PV 100.

The storage battery 200 stores power. The storage battery 200 is charged with the DC power from the storage PCS 250 via a storage power line PL2 provided between the storage PCS 250 and the storage battery 200, and converts discharged DC power into AC power in the storage PCS 250 to be output to the distribution board 300.

The PV PCS 150 converts the DC power acquired by the power generation of the PV 100 into the AC to be output. During the interconnected operation, the PV PCS 150 outputs the AC power to the distribution board 300 via a PV interconnection output line PL3 provided between the distribution board 300 and the PV PCS 150. On the other hand, during an independent operation, the PV PCS 150 outputs the AC power to the storage PCS 250 via a PV independent output line PL4 provided between the storage PCS 250 and the PV PCS 150.

The PV PCS 150 includes an inverter 151, a grid interconnection relay 152, an independent output relay 153, a PV controller 154, a sensor 155, and a sensor 156.

The inverter 151 converts DC power output from the PV 100 into AC under the control of the PV controller 154.

The grid interconnection relay 152 is turned on and off under the control of the PV controller 154. The PV 100 is interconnected to the grid 10 when the grid interconnection relay 152 is in an on state and the PV 100 is off-lined from the grid 10 when the grid interconnection relay 152 is in an off state. The interconnected operation is in an operation state in which the grid interconnection relay 152 is in an on state and the inverter 151 outputs the AC power.

The independent output relay 153 is turned on and off under the control of the PV controller 154. The independent operation is in an operation state in which the independent output relay 153 is in an on state and the inverter 151 outputs the AC power. It is noted that the grid interconnection relay 152 and the independent output relay 153 are controlled by the PV controller 154 such that only one of the grid interconnection relay 152 and the independent output relay 153 comes into an on state.

The PV controller 154 controls various types of functions of the PV PCS 150, and is configured by using a processor or a memory. The PV controller 154 is configured to be able to communicate with the storage PCS 250 via a communication line CL. The PV controller 154 and a storage controller 253 detect a state of being able to communicate with each other and make a state where control described below can be implemented. It is noted that the PV controller 154 is not limited to a configuration in which direct communication is performed with the storage controller 253 but may exchange information via a transceiver, a server, or a controller. Further, the information may be exchanged by wired or wireless communication.

The PV controller 154 is configured to perform interconnection stop control to detect a state where an output power amount of the PV PCS 150 is too small with respect to a power consumption amount of the load 400, turn off the grid interconnection relay 152, and stop the inverter 151 during the interconnected operation. Further, when detecting a state where output power of the PV 100 can be acquired after performing interconnection stop control, the PV controller 154 performs startup control for starting an interconnected operation. The startup control will be described later.

The sensor 155 is provided on the PV power line PL1, measures an output power state (voltage and current) of the PV 100, and outputs a measurement result to the PV controller 154.

The sensor 156 is provided on the PV independent output line PL4, measures an output power state (voltage and current) of the PV PCS 150, and outputs a measurement result to the PV controller 154. However, in the present embodiment, the sensor 156 may not be provided.

During charging, the storage PCS 250 converts the AC power (mainly nighttime power) from the grid 10 and the AC power from the PV PCS 150 into DC to be output to the storage battery 200. On the other hand, during discharging, the storage PCS 250 converts DC power acquired by discharge of the storage battery 200 into AC and outputs the AC to the distribution board 300 via a storage interconnection input/output line PL5 provided between the distribution board 300 and the storage PCS 250.

The storage PCS 250 includes a bidirectional converter 251, a grid interconnection relay 252, the storage controller 253, and a sensor 254.

The bidirectional converter 251 converts the DC power output from the storage battery 200 into AC, and the AC power from the grid 10 and the AC power from the PV PCS 150 into DC under the control of the storage controller 253.

The grid interconnection relay 252 is turned on and off under the control of the storage controller 253. The storage battery 200 is interconnected to the grid 10 when the grid interconnection relay 252 is in an on state and the storage battery 200 is off-lined from the grid 10 when the grid interconnection relay 252 is in an off state.

The storage controller 253 controls various types of functions of the storage PCS 250, and is configured by using a processor or a memory. The storage controller 253 is configured to be able to communicate with the PV controller 154 via a communication line CL. During an independent operation of the PV PCS 150, the storage controller 253 performs a part of startup control for starting an interconnected operation of the PV PCS 150. The startup control will be described later.

The sensor 254 is provided on the PV independent output line PL4, measures an output power state (voltage and current) of the PV PCS 150, and outputs a measurement result to the PV controller 154.

The distribution board 300 supplies the AC power output from the PV PCS 150 and the AC power output from the storage PCS 250 to the load 400. When the total output AC power amount of the PV PCS 150 and the storage PCS 250 is smaller than the power consumption amount of the load 400, the distribution board 300 receives (buys) a shortfall of the AC power from the grid 10, and supplies the AC power to the load 400 with via a grid power line PL7. Further, when the total output AC power amount of the PV PCS 150 and the storage PCS 250 is larger than the power consumption amount of the load 400, the distribution board 300 causes reverse power flow (sells) of an excess of the AC power to the grid 10 via the grid power line PL7. It is noted that reverse power flow by the storage battery 200 (the storage PCS 250) is not permitted, and thus reverse power flow is limited to output AC power of the PV PCS 150.

The AC power is supplied to the load 400 via a power supply line PL6 provided between the distribution board 300 and the load 400, and the load 400 consumes the supplied AC power for operation. There may be one or plural loads 400. In the load 400, not just household electrical appliances such as lighting, or an air conditioner, a refrigerator, and television, but a heat accumulator and the like may be included.

Next, a startup control method of the PV PCS 150 according to the present embodiment will be described.

Here, an overview of a startup control method according to the present embodiment will be described. The startup control method according to the present embodiment is to control startup of the PV PCS 150 configured to perform an interconnected operation to interconnect the PV 100 to the grid 10 and supply power to the load 400.

Firstly, the startup control method according to the present embodiment supplies power from independent operation output of the PV PCS 150 to the storage PCS 250 by independent operation in which the PV 100 is not interconnected to the grid 10 before starting the interconnected operation of the PV PCS 150. Secondly, when power is supplied from the PV PCS 150 to the storage PCS 250, the output power amount of the PV 100 or the PV PCS 150 is measured. Thirdly, when the measured output power amount is larger than a predetermined amount, the independent operation is stopped and the interconnected operation is started.

Thus, in the startup control method according to the present embodiment, the storage battery 200 is used as a predetermined load and a test is performed for checking whether the output power amount of the PV 100 can be sufficiently acquired by the independent operation. Then, after it is confirmed that the output power amount of the PV 100 can be sufficiently acquired, the interconnected operation is started to supply power to the load 400, thereby preventing the PV PCS 150 from stopping immediately after startup.

Figure 2:
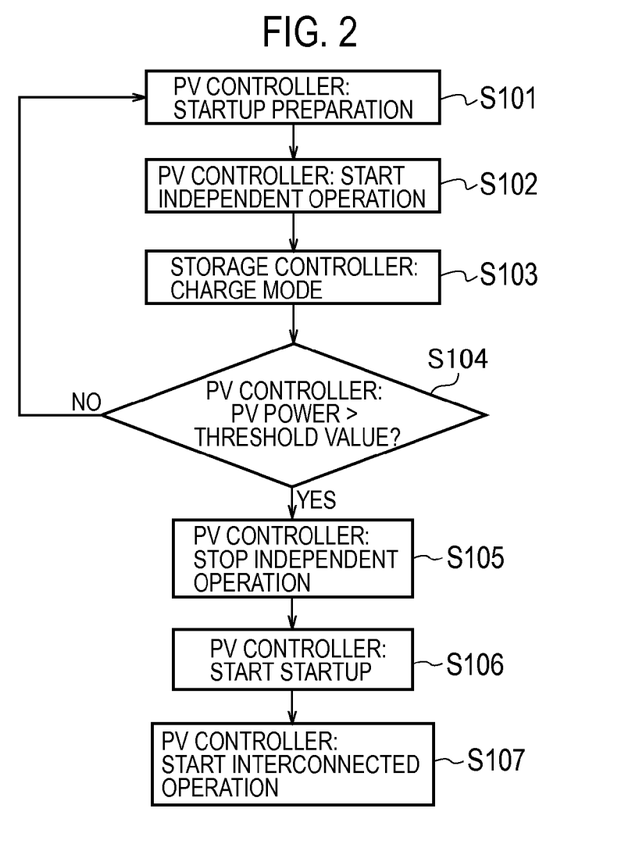
FIG. 2 is a flowchart of the startup control method according to the first embodiment and the third embodiment.

FIG. 2 is a flowchart of the startup control method according to the present embodiment. The present flow is performed, for example, from a state in which a solar radiation amount to the PV 100 is zero (that is, at nighttime) to the timing when the solar radiation amount exceeds zero (that is, in early morning). At a time point of starting the present flow, in the PV PCS 150, each of the grid interconnection relay 152 and the independent output relay 153 is in an off state and the inverter 151 is in a state of being stopped.

As shown in FIG. 2, in step S101, the PV controller 154 detects a state in which output power of the PV 100 can be acquired and shifts to a startup preparation state for starting up the PV PCS 150 to start an interconnected operation.

In step S102, the PV controller 154 turns on the independent output relay 153 to start operation of the inverter 151, thereby starting the independent operation of the PV PCS 150. As a consequence, the AC power output from the inverter 151 is input to the bidirectional converter 251 of the storage PCS 250 via the independent output relay 153 and the PV independent output line PL4.

In step S103, when detecting that the AC power is supplied via the PV independent output line PL4, the storage controller 253 starts a charge mode for charging the storage battery 200. In the charge mode, the storage controller 253 controls a charge amount of the storage battery 200 to gradually increase from zero. It is noted that the charge amount is indicated by any one of current, voltage, power, and current or voltage per unit time.

When the charge amount of the storage battery 200 is increased stepwise from zero, the output voltage value of the PV 100 is gradually decreased. The PV controller 154 measures the output current value of the PV 100 when the output voltage value of the PV 100 is gradually decreased, and measures the product of the output voltage value and the output current value of the PV 100 as the output power amount of the PV 100.

Then, in step S104, the PV controller 154 determines whether or not to perform the interconnected operation of the PV PCS 150 on the basis of the PV output power amount that is measured until the output voltage value of the PV 100 is decreased by a certain value or more. Particularly, in a case where the PV output power amount that is measured until the output voltage value of the PV 100 is decreased by a certain value or more exceeds a startup condition threshold value (step S104; YES), it is determined to perform the interconnected operation of the PV PCS 150 and the process is advanced to step S105. On the other hand, when the PV output power amount is smaller than the startup condition threshold value (step S104; NO), it is determined not to perform the interconnected operation of the PV PCS 150 at this point and the process is returned to step S101.

Figure 3:
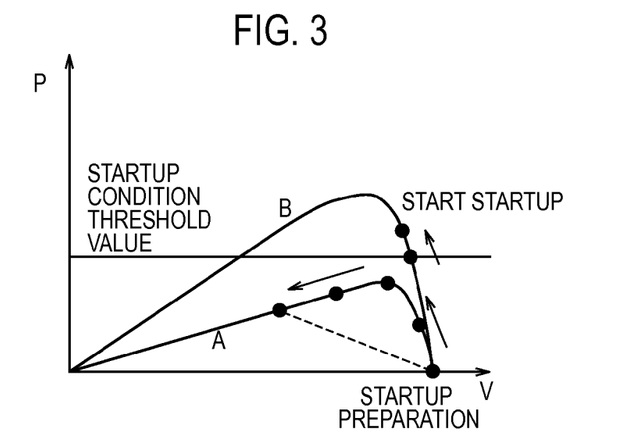
FIG. 3 is a diagram showing a specific example of V-P characteristics of the PV.

FIG. 3 is a diagram showing a specific example of relation between the output voltage (V) and the output power (P) of the PV 100 (that is, V-P characteristics). "A" in FIG. 3 indicates the V-P characteristics of the PV 100 when the solar radiation amount can be hardly acquired in the PV 100 and "B" indicates the V-P characteristics of the PV 100 when the solar radiation amount can be acquired in the PV 100 to a certain extent.

As shown in FIG. 3, in the V-P characteristics "A", in the process that the output voltage value V of the PV 100 is decreased, the output power amount P of the PV 100 does not exceed the startup condition threshold value. In such a case, the PV controller 154 determines not to perform the interconnected operation of the PV PCS 150.

Meanwhile, in the V-P characteristics "B", in the process that the output voltage value V of the PV 100 is decreased, the output power amount P of the PV 100 exceeds the startup condition threshold value. In such a case, the PV controller 154 determines to perform the interconnected operation of the PV PCS 150.

In step S105, the PV controller 154 turns off the independent output relay 153, thereby stopping the independent operation of the PV PCS 150.

In step S106, the PV controller 154 shifts from a startup preparation state to a startup state.

In step S107, the PV controller 154 turns on the grid interconnection relay 152 while continuing the operation of the inverter 151, thereby starting the interconnected operation.

As described above, the PV PCS 150 has supplying means (the inverter 151, the independent output relay 153, and the storage controller 253) that supplies power from the independent operation output of the PV PCS 150 to the storage PCS 250 by the independent operation that does not interconnect the PV 100 to the grid 10 before starting the interconnected operation at the time of starting up the PV PCS 150, and interconnected operation means (the inverter 151, the grid interconnection relay 152, and the PV controller 154) that stops the independent operation to start the interconnected operation in a case where the output power amount of the PV 100 when power is supplied from the independent operation output to the storage PCS 250, is larger than a predetermined amount.

It is possible to perform the test to check how much the output power amount of the PV 100 can be acquired during the interconnected operation by performing the independent operation before starting the interconnected operation in this way. In addition, it is confirmed that the output power amount of the PV 100 can be sufficiently acquired, and then the interconnected operation is started, thereby preventing the PV PCS 150 from being stopped immediately after the startup, thus making it possible to prevent the PV PCS 150 from repeating the startup and stop.

In the present embodiment, the storage battery 200 with a variable charge amount, is charged with power supplied from the PV PCS 150. In this way, it is possible to check stepwise how much the output power amount of the PV 100 can be extracted by using the storage battery 200 with a variable charge amount as a predetermined load for the test. In addition, power that can be acquired during such test is not consumed but used for charge, and therefore the power can be saved.

It is noted that in the present embodiment, the PV controller 154 determines whether or not the interconnected operation of the PV PCS 150 is started (started up) on the basis of the output power amount of the PV 100, however, may determine whether or not the interconnected operation of the PV PCS 150 is started (started up) may be determined on the basis of the output power amount of the PV PCS 150.

Second Embodiment

Hereinafter, a second embodiment will be described on a difference from the first embodiment.

The power control system according to the present embodiment is configured in much the same way as the first embodiment, however, apart of the startup control method of the PV PCS 150 is different from that of the first embodiment.

Figure 4:
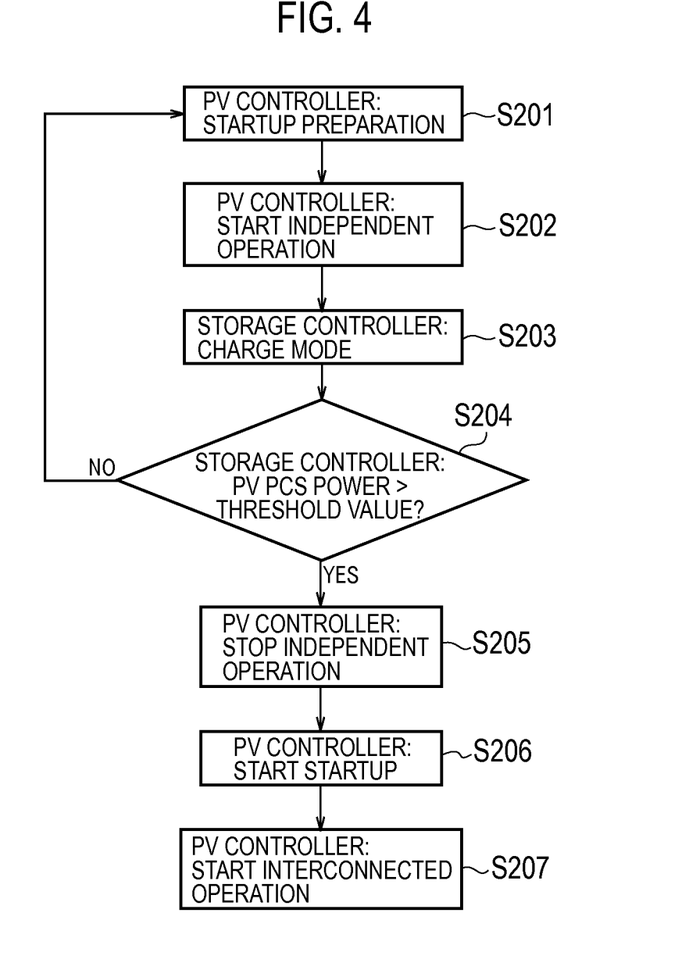
FIG. 4 is a flowchart of the startup control method according to the second embodiment and the third embodiment.

FIG. 4 is a flowchart of the startup control method according to the present embodiment. In the present flow, since each of steps other than steps S203 to S205 is the same as that in the first embodiment, steps S203 to S205 will be described.

As shown in FIG. 4, in step S203, when detecting that the AC power is supplied via the PV independent output line PL4, the storage controller 253 starts a charge mode for charging the storage battery 200. In the charge mode, the storage controller 253 controls a charge amount of the storage battery 200 to gradually increase from zero. When the charge amount of the storage battery 200 is increased stepwise from zero, the output voltage value of the PV PCS 150 is gradually decreased. The storage controller 253 measures the output current value of the PV PCS 150 when the output voltage value of the PV PCS 150 is gradually decreased, and measures and the product of the output voltage value and the output current value of the PV PCS 150 as the output power amount of the PV PCS 150.

Then, in step S204, the storage controller 253 determines whether or not to perform the interconnected operation of the PV PCS 150 on the basis of the PV PCS output power amount that is measured until the output voltage value of the PV PCS 150 is decreased by a certain value or more. Particularly, in a case where the PV output power amount that is measured until the output voltage value of the PV PCS 150 is decreased by a certain value or more exceeds a startup condition threshold value (step S204; YES), the storage controller 253 determines to perform the interconnected operation of the PV PCS 150, transmits a notification to the effect that the PV output power amount exceeds the startup condition threshold value to the PV controller 154 via the communication line, and the process is advanced to step S205. On the other hand, when the PV PCS output power amount is less than the startup condition threshold value (step S204; NO), the storage controller 253 determines not to perform the interconnected operation of the PV PCS 150 at this point, transmits a notification to the effect that the PV output power amount is less than the startup condition threshold value to the PV controller 154 via the communication line, and the process is returned to step S201.

In step S205, in response to the notification from the storage controller 253, the PV controller 154 turns off the independent output relay 153, thereby stopping the independent operation of the PV PCS 150. Thereafter, the PV controller 154 starts the interconnected operation in the same way as the first embodiment.

As described above, it is possible to perform the test to check how much the output power amount of the PV PCS 150 can be acquired during the interconnected operation by performing the independent operation before starting the interconnected operation. In addition, it is confirmed that the output power amount of the PV PCS 150 can be sufficiently acquired, and then the interconnected operation is started, thereby eliminating that the PV PCS 150 is stopped immediately after startup, thus making it possible to prevent the PV PCS 150 from repeating the startup and stop.

Third Embodiment

Figure 5:
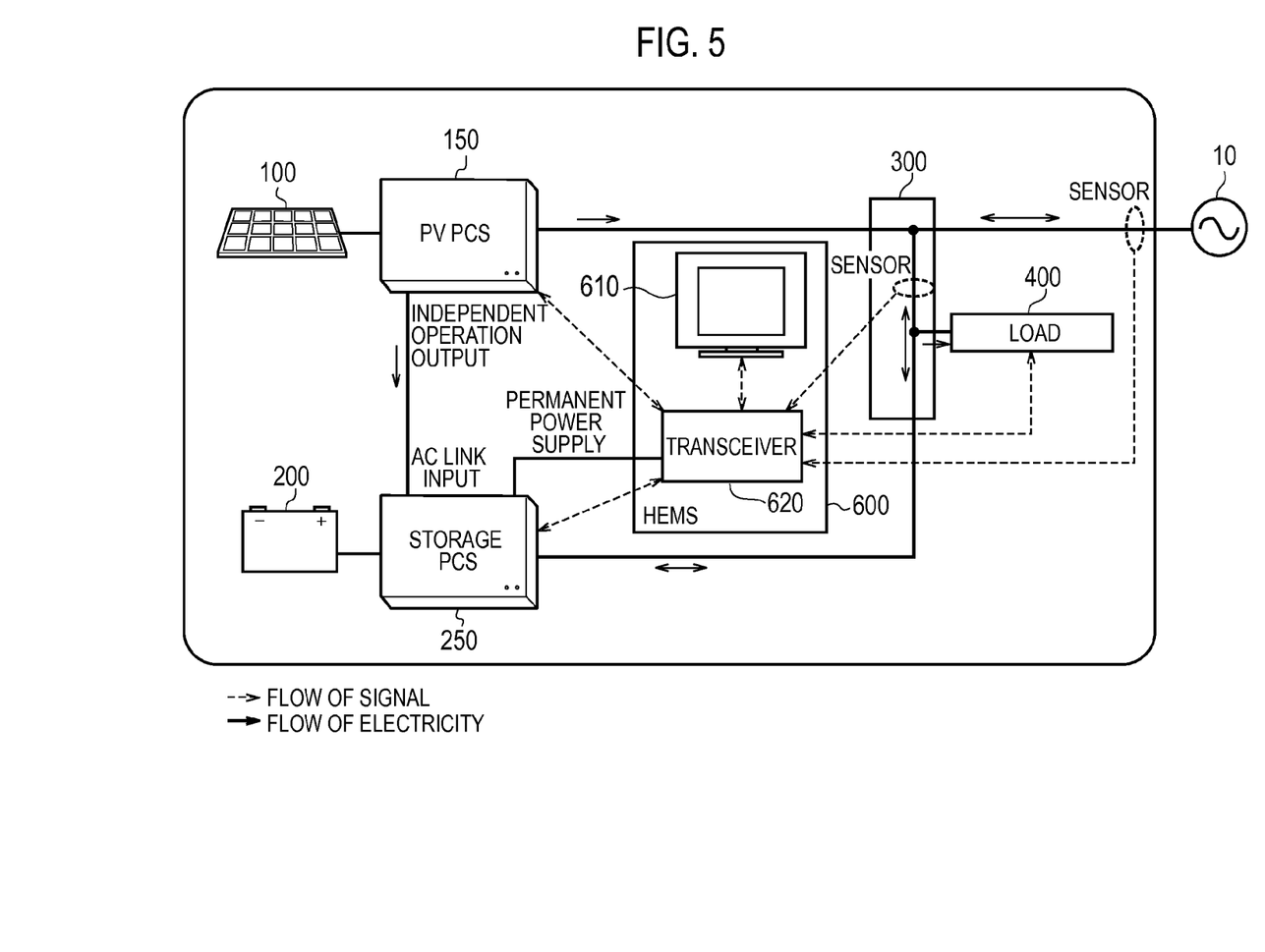
FIG. 5 is a block diagram of the power control system according to the third embodiment.

Hereinafter, the third embodiment will be described on a difference from the first embodiment and the second embodiment. FIG. 5 is a block diagram of the power control system according to the present embodiment.

As shown in FIG. 5, the power control system according to the present embodiment is different from the first embodiment and the second embodiment in terms of having a HEMS (Home Energy Management Grid) 600. The HEMS 600 performs power management in a consumer. The HEMS 600 has a function of controlling each apparatus in the consumer by transmitting various types of control commands to the PV PCS 150, the storage PCS 250, and the load 400, and a function of collecting various types of measurement values and of monitoring and displaying a state of the each apparatus in the consumer. In the present embodiment, the HEMS 600 corresponds to the controller that controls the PV PCS 150 (the grid interconnection apparatus).

The HEMS 600 includes a HEMS controller 610 and a transceiver 620. The HEMS controller 610 is configured by using a processor and a memory, and controls each apparatus in the consumer by using the transceiver 620. The transceiver 620 is configured to perform communication with each equipment in the consumer.

In a power supply grid thus configured, the HEMS 600 performs control for implementing the startup control method according to the first embodiment or the startup control method according to the second embodiment.

Firstly, description will be given for operation when the HEMS 600 performs control for implementing the startup control method according to the first embodiment by using the flowchart of FIG. 2.

As shown in FIG. 2, in step S101, the HEMS 600 detects a state where output power of the PV 100 can be acquired and shifts to a startup preparation state for starting up the PV PCS 150 to start an interconnected operation.

In step S102, the HEMS 600 controls the PV PCS 150 to start the independent operation. As a consequence, the AC power output from the inverter 151 is input to the bidirectional converter 251 of the storage PCS 250 via the independent output relay 153 and the PV independent output line PL4.

In step S103, when detecting that the AC power is supplied via the PV independent output line PL4, the HEMS 600 controls the storage PCS 250 to start a charge mode for charging the storage battery 200. The HEMS 600 performs control in the charge mode so that the charge amount of the storage battery 200 is gradually increased from zero. When the charge amount of the storage battery 200 is increased stepwise from zero, the output voltage value of the PV 100 is gradually decreased. The HEMS 600 measures the output current value of the PV 100 when the output voltage value of the PV 100 is gradually decreased and measures the product of the output voltage value and the output current value of the PV 100 as the output power amount of the PV 100.

Then, in step S104, the HEMS 600 determines whether or not to perform the interconnected operation of the PV PCS 150 on the basis of the PV output power amount that is measured until the output voltage value of the PV 100 is decreased by a certain value or more. Particularly, in a case where the PV output power amount that is measured until the output voltage value of the PV 100 is decreased by a certain value or more exceeds a startup condition threshold value (step S104; YES), it is determined to perform the interconnected operation of the PV PCS 150 and the process is advanced to step S105. On the other hand, when the PV output power amount is less than the startup condition threshold value (step S104; NO), it is determined not to perform the interconnected operation of the PV PCS 150 at this point and the process is returned to step S101.

In step S105, the HEMS 600 controls the PV PCS 150 to stop the independent operation.

In step S106, the HEMS 600 shifts the PV PCS 150 from a startup preparation state to a startup state.

In step S107, the HEMS 600 controls the PV PCS 150 to start the interconnected operation.

Next, description will be given for operation when the HEMS 600 performs control for implementing the startup control method according to the second embodiment by using the flowchart of FIG. 4. However, description of operation that overlaps operation when performing control for implementing the startup control method according to the first embodiment, will be omitted.

As shown in FIG. 4, in step S203, when detecting that the AC power is supplied via the PV independent output line PL4, the HEMS 600 controls the storage PCS 250 to start a charge mode for charging the storage battery 200. The HEMS 600 performs control in the charge mode so that the charge amount of the storage battery 200 is gradually increased from zero. When the charge amount of the storage battery 200 is increased stepwise from zero, the output voltage value of the PV PCS 150 is gradually decreased. The HEMS 600 measures the output current value of the PV PCS 150 when the output voltage value of the PV PCS 150 is gradually decreased and measures the product of the output voltage value and the output current value of the PV PCS 150 as the output power amount of the PV PCS 150.

Then, in step S204, the HEMS 600 determines whether or not to perform the interconnected operation of the PV PCS 150 on the basis of the PV PCS output power amount that is measured until the output voltage value of the PV PCS 150 is decreased by a certain value or more. Particularly, when the PV output power amount that is measured until the output voltage value of the PV PCS 150 is decreased by a certain value or more exceeds a startup condition threshold value (step S204; YES), the HEMS 600 determines to perform the interconnected operation of the PV PCS 150 and the process is advanced to step S205. On the other hand, when the PV PCS output power amount is smaller than the startup condition threshold value (step S204; NO), it is determined not to perform the interconnected operation of the PV PCS 150 at this point and the process is returned to step S201.

In step S205, the HEMS 600 controls the PV PCS 150 to stop the independent operation.

As described above, the HEMS 600 according to the present embodiment has supply control means (the HEMS controller 610 and the transceiver 620) that performs control to supply power from the independent operation output of the PV PCS 150 to the storage PCS 250 by the independent operation that does not interconnect the PV 100 to the grid 10 before starting the interconnected operation at the time of starting up the PV PCS 150, and operation control means (the HEMS controller 610 and the transceiver 620) that performs control to stop the independent operation and start the interconnected operation in a case where the output power amount of the PV 100 or the PV PCS 150 when power is supplied from the independent operation output to the storage PCS 250, is larger than a predetermined amount. This makes it possible to implement the startup control method according to the first embodiment and the second embodiment even in a configuration in which the communication line is not provided between the PV PCS 150 and the storage PCS 250.

Other Embodiment

As described above, the present invention has been described through the embodiments. It must not be understood that, however, the discussions and the drawings constituting a part of this disclosure limit the present invention. From this disclosure, various alternative embodiments, examples and operational techniques are apparent to those skilled in the art.

In each of the above-described embodiments, description is given for an example of gradually increasing the charge amount of the storage battery 200 from zero, however, a PV output power amount or a PV PCS output power amount at the time of startup (at the time of starting the interconnected operation) on the previous day may be learned, which may be the starting point of operation. Therefore, time required for startup determination can be shortened. Further, the charge amount of the storage battery 200 is gradually increased from zero, that is, the PV output voltage is gradually decreased because the shape of the V-P characteristics (the V-P curve) of the PV 100 is taken into consideration, however, conversely, the charge amount of the storage battery 200 may be gradually decreased from a maximum value, that is, the PV output voltage may be gradually increased.

In each of the above-described embodiments, description is given for an example of supplying the AC power from the PV PCS 150 to the storage PCS 250, however, it may be configured such that DC power is supplied from the PV PCS 150 to the storage PCS 250. In this case, in FIG. 1, a DC/DC converter (not shown) provided between the PV 100 and the inverter 151 may be connected to the independent output relay 153, and the independent output relay 153 and a DC/DC converter (not shown) provided between the storage battery 200 and the bidirectional converter 251 may be connected by the PV independent output line PL4.

Further, in each of the above-described embodiments, description is given for an example of providing the PV PCS 150 and the storage PCS 250 individually, however, it may be configured such that the storage PCS 250 is integrated with the PV PCS 150 (a so-called hybrid PCS).

In each of the above-described embodiments, the storage battery 200 (and the storage PCS 250) is used as a predetermined load, however, a load with variable power consumption amount or the like may be used instead of the storage battery 200 (and the storage PCS 250). In this case, the above-described control can be implemented by changing the power consumption amount of the load manually or automatically.

Note that the entire content of the Japanese Patent Application No. 2011-161246 (filed on Jul. 22, 2011) is incorporated herein by reference.

INDUSTRIAL APPLICABILITY

As described above, the present invention is useful in electric, with which it is possible to prevent a grid interconnection apparatus from repeating startup and stop.

The invention claimed is:

1. A startup control method of controlling startup of a grid interconnection apparatus which performs an interconnected operation in which output power of a photovoltaic cell is input to the grid interconnection apparatus and the photovoltaic cell is interconnected to a grid to supply power to a load, comprising:
   (a) before starting the interconnected operation, supplying output power from a photovoltaic cell to a predetermined load via an independent operation output of the grid interconnection apparatus by an independent operation that does not interconnect the photovoltaic cell to the grid;
   (b) measuring an output power amount PV of the photovoltaic cell or the grid interconnection apparatus when power from the photovoltaic cell is supplied to the predetermined load in the independent operation of step (a); and
   (c) when the output power amount PV measured in step (b) is larger than a predetermined threshold power amount, stopping the independent operation and starting an interconnected operation of the grid interconnection apparatus in which the photovoltaic cell is interconnected to the grid to supply power to a load.

2. The startup control method according to claim 1, wherein
   the predetermined load includes a storage battery with a variable charge amount, and
   the method further comprises charging the storage battery with power supplied in step (a).

3. The startup control method according to claim 2, wherein
   step (b) includes measuring the output power amount PV of the photovoltaic cell or the grid interconnection apparatus while varying the charge amount of the storage battery.

4. The startup control method according to claim 2, wherein
   the predetermined load includes:
   the storage battery; and
   a second grid interconnection apparatus which interconnects the storage battery to the grid, the second grid interconnection apparatus is connected to the independent operation output of the grid interconnection apparatus via a power line, and step (a) includes supplying alternating-current power to the second grid interconnection apparatus from the independent operation output via the power line.

5. A power control system which controls interconnection of a photovoltaic cell to a grid to supply power to one or more loads at a consumer, comprising:

a grid interconnection apparatus having a power input connected to a power output of a photovoltaic cell, a grid interconnection output, and an independent output;

a predetermined load which receives power from the photovoltaic cell via the independent output of the grid interconnection apparatus in an independent operation mode of the grid interconnection apparatus;

a sensor which detects an output power amount of the photovoltaic cell or the grid interconnection apparatus during the independent operation mode of the grid interconnection apparatus;

at least one controller which:

controls operation of the grid interconnection apparatus in the independent operation mode to supply power from the independent operation output of the grid interconnection apparatus to the predetermined load at the time of starting up the grid interconnection apparatus; and stops the independent operation mode and starts an interconnected operation mode in which the photovoltaic cell is interconnected to the grid when the output power amount of the photovoltaic cell or the grid interconnection apparatus is larger than a predetermined amount at the time of supplying the power from the independent operation output to the predetermined load.

6. A controller that controls a grid interconnection apparatus configured to perform an interconnected operation in which output power of a photovoltaic cell is input to the grid interconnection apparatus and the photovoltaic cell is interconnected to a grid to supply power to a load, comprising:

a supply control unit which controls supply of power from an independent operation output of the grid interconnection apparatus to a predetermined load in an independent operation that does not interconnect the photovoltaic cell to the grid at the time of starting up the grid interconnection apparatus;

a sensor unit which detects the output power amount of the photovoltaic cell or the grid interconnection apparatus during independent operation of the grid interconnection apparatus; and an operation control unit that stops the independent operation and starts the interconnected operation of the grid interconnection apparatus to connect output power of the photovoltaic cell to the grid when the detected output power amount of the photovoltaic cell or the grid interconnection apparatus is larger than a predetermined amount.

* * * * *